June 23, 1970     A. P. JENTOFT ET AL     3,516,210
FIRE AND SMOKE RELIEF VENTILATOR SKY-LIGHT DOME
Filed Nov. 19, 1968     12 Sheets-Sheet 8

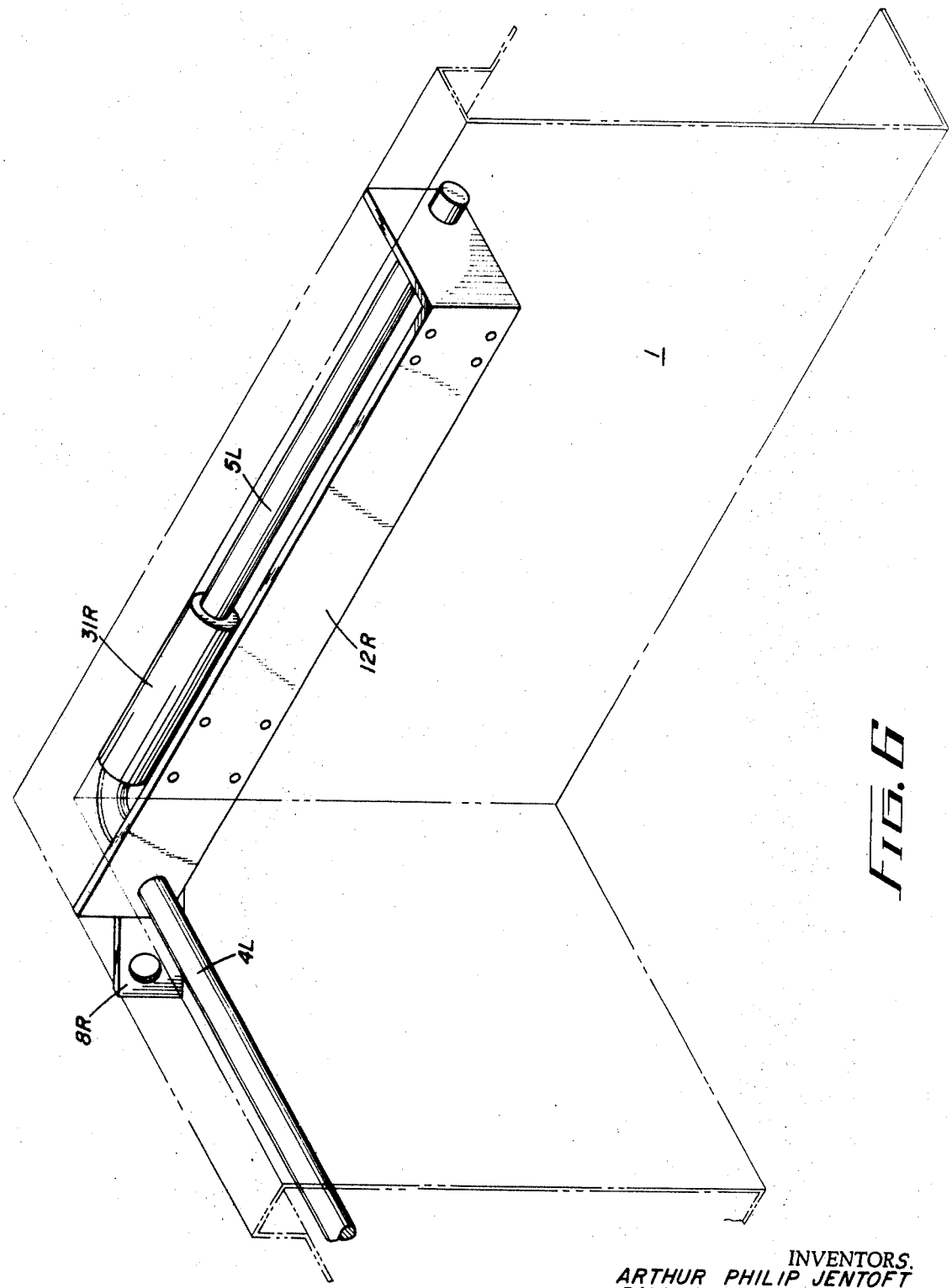

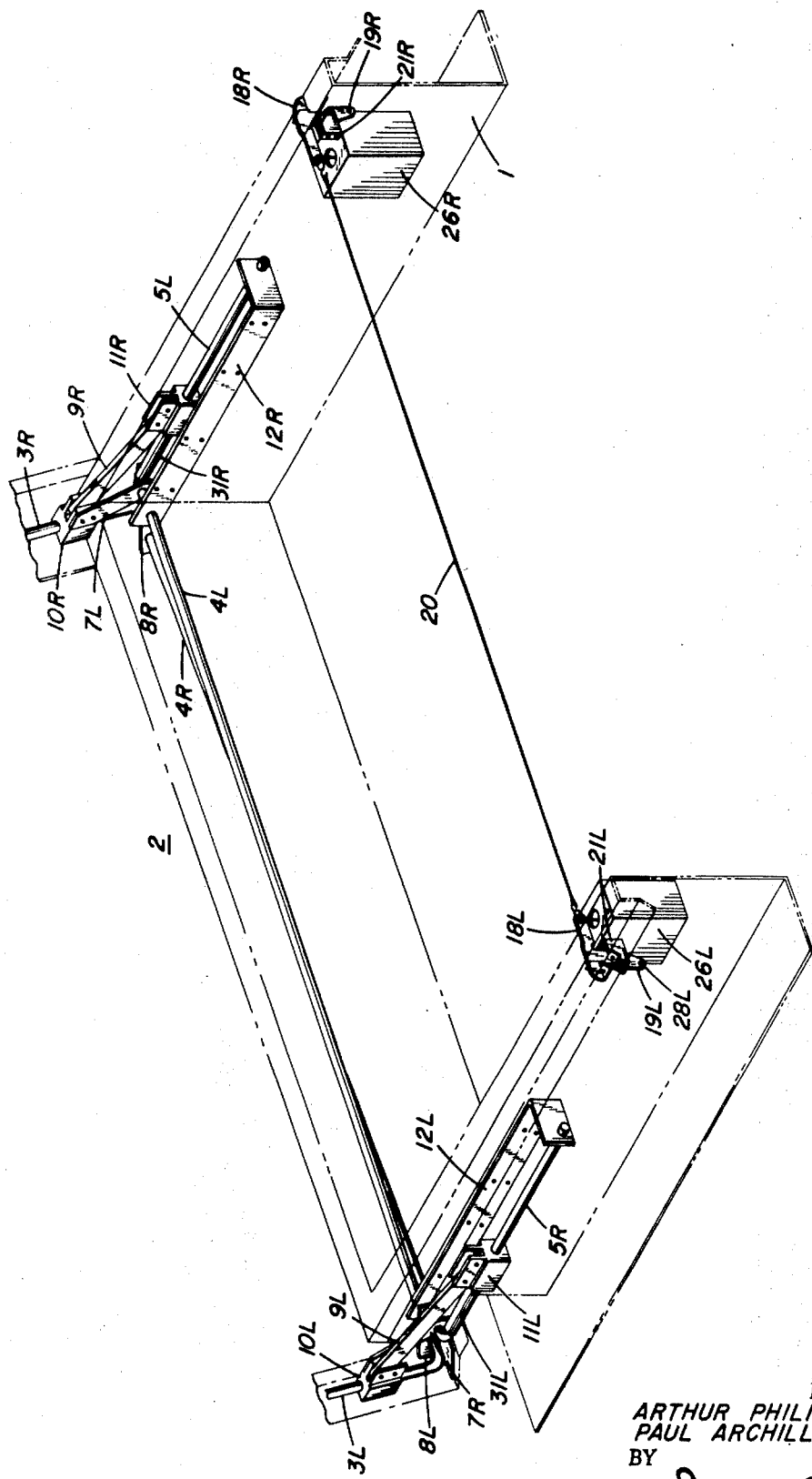

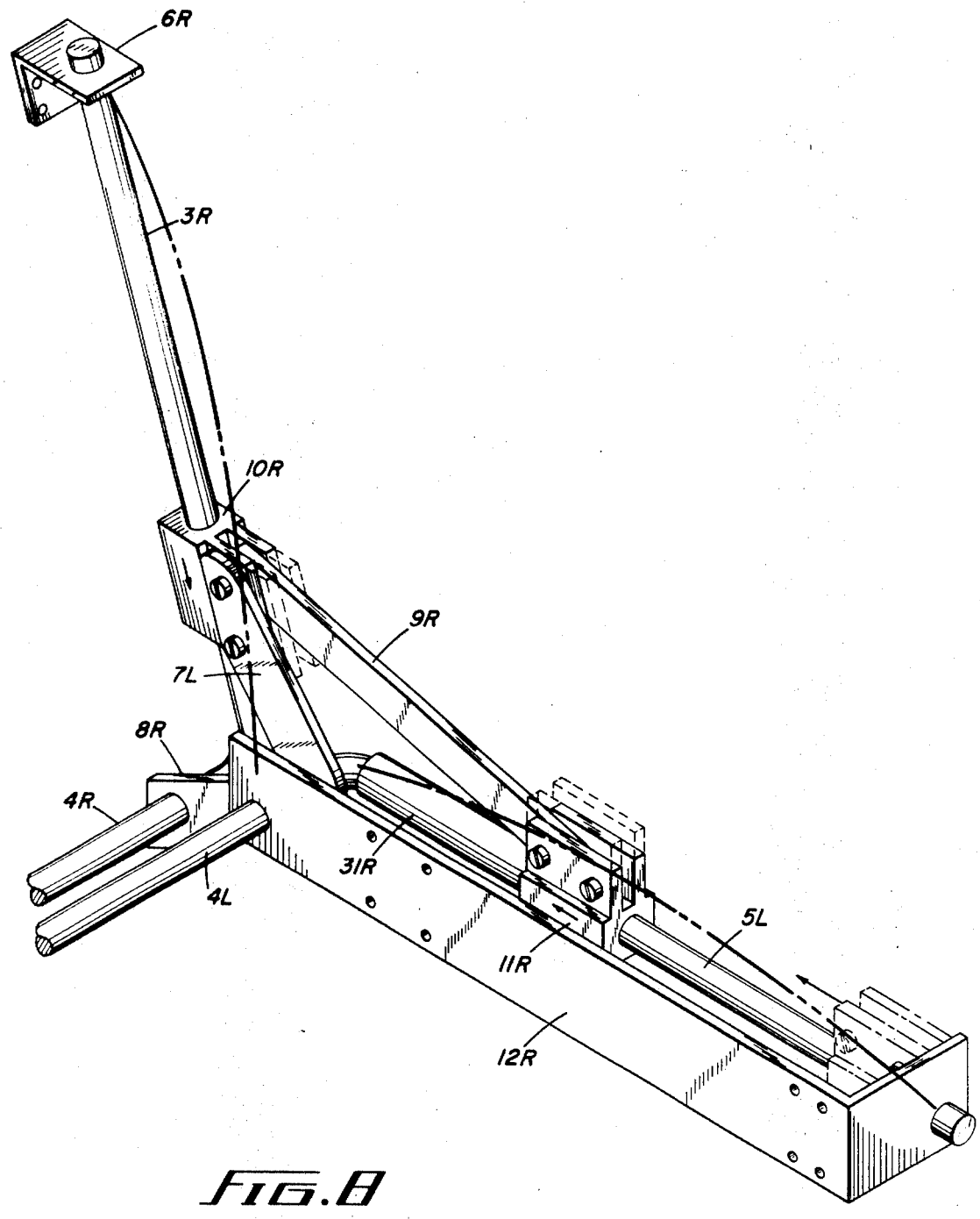

INVENTORS.
ARTHUR PHILIP JENTOFT
PAUL ARCHILLE COUTURE
BY
James T. Dunn
ATTORNEY

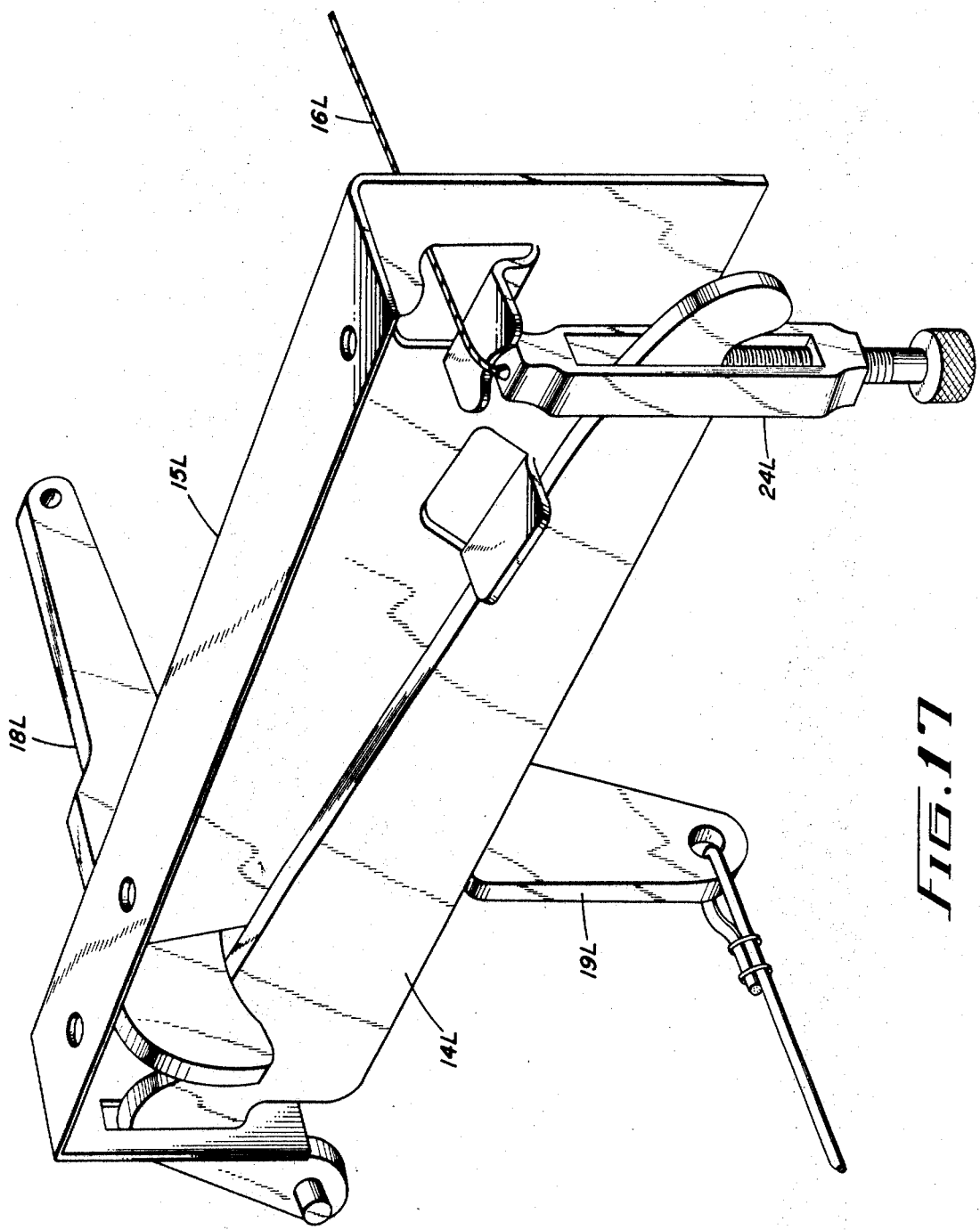

United States Patent Office 3,516,210
Patented June 23, 1970

3,516,210
FIRE AND SMOKE RELIEF VENTILATOR SKY-LIGHT DOME
Arthur Philip Jentoft, Kennebunkport, and Paul Archille Couture, Emery Mills, Maine, assignors, by mesne assignments, to Wasco Products, Inc., Sanford, Maine, a corporation of Maine
Continuation-in-part of application Ser. No. 732,743, May 28, 1968. This application Nov. 19, 1968, Ser. No. 784,509
Int. Cl. E05f *15/20*
U.S. Cl. 52—1                               8 Claims

ABSTRACT OF THE DISCLOSURE

A hinged cover which may either be opaque of metal or provided with a translucent plate or dome of plastic, such as acrylic plastic, is actuated by a torsion and bending bar or bars instead of springs and levers. The torsion bars have two legs and a central torsion portion, one leg being attached to a side of the vent to be opened and the other leg to skylight framing. The central portion of the bar, which is in torsion when the skylight or dome is closed, also acts as a hinge pin. In the loaded position the two end portions of the torsion bar are bent somewhat, and when the cover opens, the shock of opening is partially absorbed by bending of the legs of the bar. In locked holddown position there is a bolt and latch, the latches on each side being connected across the cover by a cable with a fusible link which in case of fire melts and releases the latches. Manual release of the latch without operating the fusible link controlled mechanism can be provided for opening the cover for ventilation, inspection or other purposes and, if desired, this latch can also be operated electrically by remote control through solenoids which are actuated by a manual switch or a signal from a second temperature sensing means. Locking means can also be provided which lock the cover in the open position so that it cannot be blown shut.

RELATED APPLICATION

This application is a continuation-in-part of our application Ser. No. 732,743, filed May 28, 1968, now abandoned.

BACKGROUND OF THE INVENTION

A problem is presented by buildings with flat roofs, such as, for example, many industrial buildings. If a fire breaks out and is confined by the roof, it spreads sideways and can endanger adjacent portions of the building. It is also considered desirable from the standpoint of fire control, temperature reduction, and the like, to have a series of vent covers open automatically in case of fire. This permits smoke, heat and the like to escape upward, reduces and in some cases can eliminate sideways traveling of flames and smoke, and also the open vent covers permit penetration of water from fire hoses which the fire department may wish to play on the roof. The venting of the heat and flames also keeps the roof somewhat cooler and can in many cases mean the difference between a roof which collapses from being burned through or heated to the point where its supporting members bend and one which retains its normal contours.

It has been proposed in the past to provide fire vents with powerful springs, cranks and levers which, when holddown latches are released, either as a result of fire or deliberately, cause a cover to snap open. This type of opening vent cover has been widely accepted and may in fact be considered as a more or less standard structure. In spite of the successful operation, under ordinary conditions, of such mechanisms, problems remain, so that although a workable and practical design, there is considerable room for improvement.

The first problem is presented by the springs themselves. They are quite bulky if of sufficient strength to open a cover against snow of other loads. The springs occupy a considerable space in the vent well or hatchway, and this presents a problem if it is desired to inspect the cover or operate the holddown latches by hand because the springs can catch fingers and can result in painful and even serious injury. Another drawback of the springs is that in many cases when they operate they are bent or can bind against other portions of the operating mechanism. This can cause spring breakage or, more commonly, sticking of the spring so that reliable opening has not been always obtainable under adverse conditions. The binding has been reduced by auxiliary sideways springs, but only at the expense of further complication and cost. Another, though perhaps not so serious, drawback to springs is that it is very difficult to keep them protected from rusting.

Another drawback to the spring-actuated vent cover openers is that manual actuation for inspection, emergencies, or even for use of vent cover from time to time as a hatchway to the roof has ordinarily been effected by permitting a cable to be disengaged and to move. Since this cable ordinarily contains a fusible link for fire protection, this is a significant disadvantage because it can put extra strains on a link and the mechanism permitting cables to move up further introduces more complicated operating elements in the skylight well.

A further disadvantage in most spring-actuated vent cover is that it is difficult, and in some cases practically impossible, to open the cover more than about 90°. When a fire starts under adverse circumstances, for example with high winds, which can transform a less serious fire into a catastrophe, there is a serious problem presented in two respects. First, a cover which opens at most about 90° can be in such a position that a strong wind can actually be directed down through the vent well opening, which to a considerable extent reduces the effectiveness of the vent for venting flames and smoke and may in certain other situations actually fan flames within the building. Also, a strong wind, if it blows directly against the open cover, can in certain cases cause the cover to be blown partly shut, and unless springs of excessive power, and hence size and risks to hands caught in them, are used, this can reduce the automatic safety of the venting. Of course, larger springs further block the hatchway or well and thereby decrease the vent efficiency and increase cost and weight of the installation.

As has been pointed out above, in spite of the very definite shortcomings of the spring-actuated automatic vents, they have been used practically and are perfectly operative although they are in no sense ideal because of the drawbacks above set forth. There has, therefore, remained unfulfilled a demand for automatic venting which does not have the drawbacks of the spring-actuated vents set out above.

SUMMARY OF THE INVENTION

The present invention completely eliminates all of the drawbacks set out above and does so without adding to the cost and actually, in most cases, representing a more economical and cheaper construction. In other words, the present invention may be considered as a valuable improvement on the mechanically-actuated automatic vents of the past.

The vents of the present invention completely eliminate operating springs except some very light springs for latches, and they do this by actuating the cover by a single torsion and bending bar or by a pair of such bars, one engaging one side of the cover and the other the other. In the open position, when a vent has either been automatically actuated in case of fire or deliberately opened for ventillation or other reasons, the shape of the torsion bar corresponds to a highly stylized Z in three dimensions. One leg of the Z extends along the edge of the cover and is fastened at the end and also at the point where it joins the central leg. This portion does not act as a torsion bar but does act as a bending bar for the performance of valuable functions which will be set out below. The central portion of the Z operates as a torsion bar and also as a hinge pin for the side of the cover which is the bottom when it is open. This torsion bar section is ordinarily mounted in fastenings at or near either end attached to the vent well or curb. In the case of a single bar, the attachment is to one side of the well; and in the case of a pair of bars, the attachment is to one side for one bar and to the other for the other. The final section of the Z, which also acts as a bending bar, is fastened at its end in the vent well structure. Where there is a torsion bar for the other side of the vent, is is of the same shape but of course its elements are reversed.

The greatly simplified description of the torsion bar or bars set out above deals with the position when the cover is open. When it is closed, it will be obvious that one leg of each bar moves down with it, putting the central section of each bar under torsion. In its closed position the cover is held down by latches. Although latches which, as individual structural elements are not broadly new, can be used, their shape may be changed in order to permit the desirable functions of the present invention. Such a unique new latching system is included which contains three completely independent modes of operation.

It is also an important practical advantage of a preferred form of the present invention that a cable with a fusible link can be mounted across the inside of the cover itself, permitting hold-down latches on the sides to release when the fusible link fuses. The fusible link actuating structure, therefore, moves with the cover, is not subjected to any strain, as is the case where the fusible link and its cord or chain is also used for manual operation of the cover, and it is relatively inconspicuous and does not extend down into the well or hatchway, making it impossible for it to snag on anything and also providing a free and substantially unencumbered opening so that the well can be used as a hatchway for access to the roof, or as a skylight. When the cover is opened manually and is used either as an open ventilator in warm weather or as an access hatch to the roof, there is no possibility of unintended breaking of the fusible link and it, therefore, remains protected and capable of performing its automatic action in the case of a fire with an enhanced degree of reliability. At the same time there is no risk in using the well as an access hatch by persons because they cannot catch their hands in a spring or otherwise either derange the mechanism or injure themselves.

Another important feature of the invention made possible by the peculiar shape of the combined torsion and bending bar mechanism is that it is easy to have the cover opened automatically to a considerably wider angle than is practical with springs and levers. It is thus possible to open the covers to an angle, for example between 120° and 140°, such that there is no risk in the case of a fire that there will be a downdraft when there is a high wind blowing outside. Also, in the open position it is easier to lock the cover against possible blowing shut by a high wind.

Another important additional function is performed by the mechanism of the present invention. The high degree of opening power which is readily obtained with torsion bars and which can far exceed anything practical with springs of usable size is that in the case of sudden opening of the cover in the case of fire it is opened with a great deal of force and there is a risk that the opening will be beyond what is desired and possibly with such a jerk as to injure the vent structure. In the case of the present invention, when the cover snaps open and reaches its normal opening angle, for example 130°, and tends to open still further, this causes the two end elements of the Z-shaped torsion bar to bend and in so doing they absorb a large portion of the shock. It should be noted that this additional function is performed without any added elements but as a part of the torsion bar shape. In other words, an additional and valuable function is performed by the same elements which open the cover. This is not to say that further snubbing of the cover may not be incorporated. As a matter of fact, there will be described in specific preferred embodiments an additional rigid snubbing device by the sliding of sleeves along guide bars at the two sides of the vent enclosure. However, such additional snubbing can be made much lighter and less complicated because of the great amount of the shock received by this snubbing device develops bending in the two leg elements of each torsion bar. The basic construction of the present invention therefore performs the additional advantageous function whether this is used as the only snubbing means or whether it cooperates with additional snubbing means. It will be noted when these additional means are described in more detail in conjunction with preferred embodiments that they are situated at the sides of the hatchway or vent well and do not impede ingress. Also, they do not present the serious risk of injury to person's hands which can result from being caught in powerful actuating springs, and do not reduce the well opening for ventilation or smoke relief.

When the cover is closed, of course, the torsion bar is twisted so that it is now no longer a three-dimensional Z but a two-dimensional stylized C. In other words, the endw members are no wsubstantially parallel to each other and in the same plane. When so under load, both end members are now substantially parallel to each other and in the same plane. When so held under load, both end members bend somewhat, just as they do when they absorb the shock of a sudden opening. This bending does not involve a great movement and does not introduce any contours which would cause trouble with the use of the vent as a batch.

The hold-down latches may be only a manual latch which can be opened from the roof for inspection, if necessary with suitable provisions for padlocking so as to prevent unauthorized use, and it is possible also to actuate the release by remote control, for example through solenoids which may be actuated by additional fire alarms that produce an electrical signal or by remote control pushbutton or both. It will be noted that when this additional means for unlatching the mechanism is present there are two completely independent fire alarm means so that if one should fail the other will still be able to function, resulting in a desirable additional degree of reliability by reason of the actutaing mechanism redundance.

Although wind pressure on the opened cover is greatly reduced by reason of the much wider angle, it can still be significant, and it is therefore often desired to provide some mechanism for locking the cover in the opened position until released by hand. This concept as a broad idea is not new and has, in some cases, been incorporated with spring-operated vent covers. However, most of the spring-operated mechanisms required a considerable linkage and usually locking mechanisms were of a nature so that they could readily catch and seriously hurt a person's finger. It is a further advantage of the present invention that locking mechanisms can be provided completely out of the way for anyone going up through a vent well as a hatchway with little and usually no risk of possible catching of hands in such locking mechanisms. Therefore, while it is not the first time that a locking mechanism has been used with an automatically opening ventilator, the present invention permits a simpler, cheaper, and safer design.

While this is not the most serious drawback of the spring-actuated ventilators which have hitherto been used, the risk of rusting is nevertheless a real one. It is an advantage of the present invention that it can be eliminated entirely by using stainless steel torsion bars, or if it is desired to use the cheaper carbon steel ones, they can be covered with corrosion resistant coverings, for example plastic coverings, which is much more difficult and sometimes not practical with ordinary actuating springs. In this respect also the present invention permits real practical advantages without additional costs or with an actual marked saving.

Although the bending of the end members of the torsion bars solved to a considerable degree the problem of shock when a cover is snapped open, it is possible to provide pneumatic or hydraulic dampers on the sides, which will cause a slower and more gradual opening of the cover. The shock absorbing capabilities of the torsion bar mechanism of the present invention, which can be coupled, if desired, with a rigid snubbing system which further utilizes the bending capabilities of the torsion bar legs for shock absorption, is ordinarily adequate. However, where a slower or more gradual opening of the cover is desired, this can be provided, but ordinarily the considerable additional cost of the more sophisticated mechanism is not worthwhile. However, where for any reason a slow opening cover is considered worth the additional cost, it is of advantage that this can be incorporated in the mechanism of the present invention more easily and less conspicuously than with spring-actuated devices, so that even here the advantages of the present invention are obtained without offsetting disadvantages and even with more economical construction possibilities.

Automatic venting assemblies according to the present invention are ordinarily shipped in the closed position to conserve space, eliminate risk of damage, and the like. In the closed position, of course, the torsion bar is under high torsion and it is at least theoretically possible that it might try to open during shipping. The design of the torsion bars has the additional advantage that safety plates or safety cables during shipment can be mounted cheaply and simply, which is an additional advantage.

For some purposes it is desirable, for example in one or more vents which are to be used as hatchways for roof access, to be able to open and close the cover from inside, and the unencumbered free space of the vent well or hatchway makes such constructions very simple, for example by providing a cable which can be pulled manually or actuated by an electric motor inside of the building, or by separate short chains on each latch.

As the present invention relates directly and principally to the opening mechanism for the vent cover, it is in general not greatly concerned with details of the construction of the ventilator itself and other mechanical or architectural features. Accordingly, the invention will be described with very simple, typical construction and to a large extent diagrammatically.

BRIEF DESCRIPTION OF THE DRAWINGS

FIG. 6 is a semi-diagrammatic isometric of an enlarged detail of one end of a torsion bar in the open position;

FIG. 7 is a detail of opening latches actuated by electric solenoids;

FIG. 8 is an enlarged diagram of an additional snubbing device, and illustrates the torsion bar legs bending to provide impact cushion;

FIG. 17 is a detail of the latching mechanism similar to FIG. 11 but showing two releasing mechanisms similar to that shown in FIG. 2.

DESCRIPTION OF THE PREFERRED EMBODIMENTS

Figure 1:
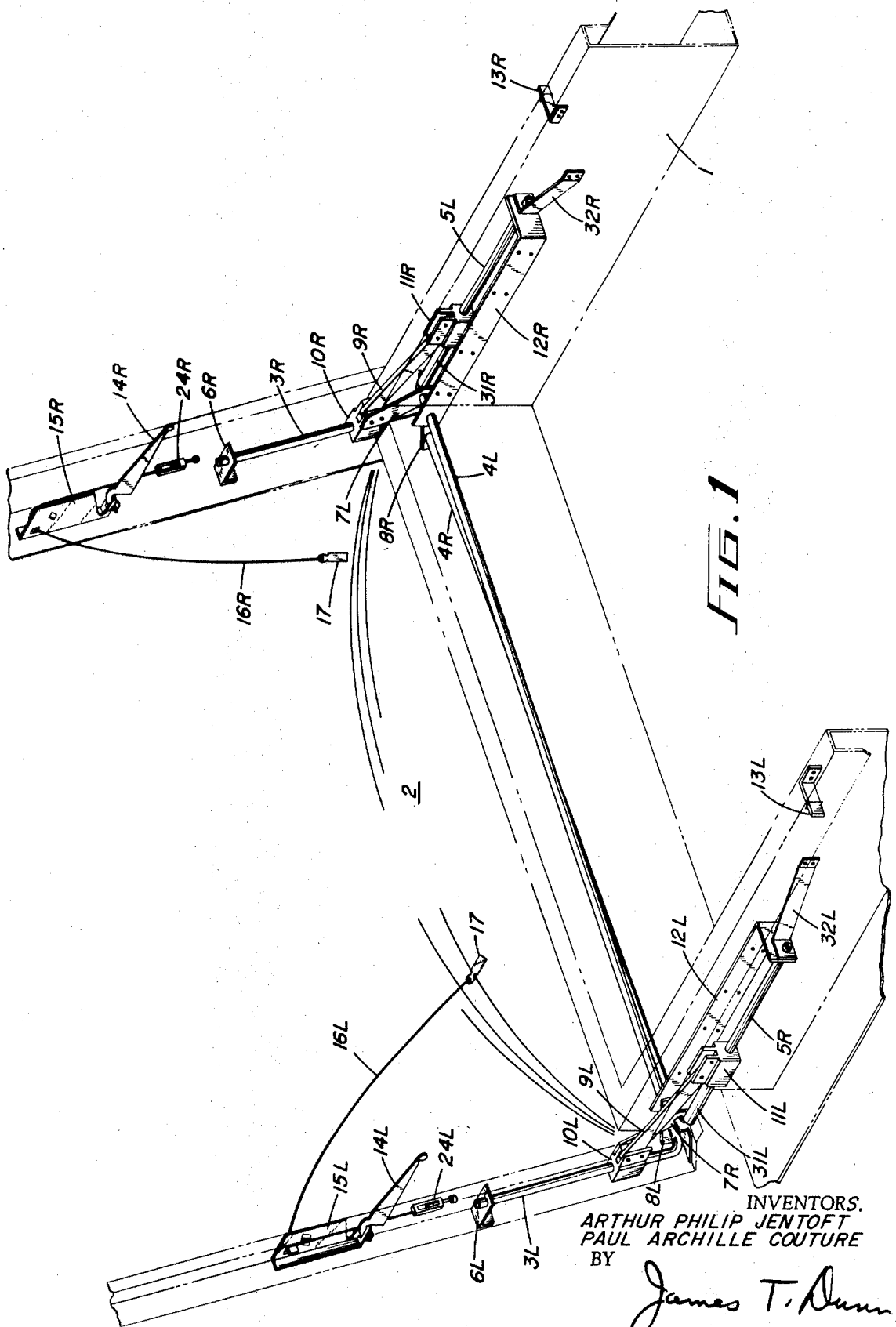
FIG. 1 is an isometric view of a ventilator and a portion of its surrounding curb in the open position after automatic opening, the fusible link being shown, melted.

The modification using a pair of torsion bars, which are useful when the cover is very large or very heavy, will first be described. FIG. 1 shows a portion of a vent and its surrounding curb in the open position after actuation by melting of a fusible link. Portions of three sides of a vent curb or frame are shown at 1 and the cover itself at 2. On the vent there appears on the left hand side of the cover the torsion bar member 3L with a center portion 4L and a third portion 5L mounted in the opposite curb. In a similar manner, at the right hand side of the skylight the torsion bar members are shown at 3R, 4R, and 5R. This form of numbering will be used throughout the specification for those portions of the mechanism which are symmetrical and appear on both sides.

The member 3L is mounted on the cover in a bracket 6L. The bar extends through a slidable snubbing bracket 10L, the function of which will be described below. After the turn to form the torsion bar section 4L, this passes through a bracket 8L which is pivotally attached through a bracket 12L bolted to the curb of the skylight. The torsion bar section 4L extends across the skylight and passes through a bracket 12R on the opposite side, which is symmetrically mounted and corresponds to bracket 12L on the left hand side. After passing through this bracket, 4L passes through another bracket 7L which is attached to the snubbing bracket 10R on the right hand side. The bar then turns again to form a bending section 5L which is journaled at its end in the bracket 12R. In a similar manner, the member 3R is mounted in a bracket 6R, passes through a slidable snubbing bracket 10R, another bracket 8R mounted on the bracket 12R, and finally, when the central torsion bar section 4R has crossed over to the left hand curb, it passes through a bracket 7R which connects to the sliding bracket 10L. Finally, after turning, the bending bar portion of the bar 5R is journaled at its end in the bracket 12L.

Snubbers 11L and 11R slide on the bending bar sections of the two torsion bars 5R and 5L respectively. They connect to the brackets 10L and 10R by links 9L and 9R which are pivotally attached to the bumpers 11L and 11R. It will be seen that the bending bar sections of the two torsion bars 5R and 5L pass through sleeves 31L and 31R. These sleeves can be seen on FIGS. 1, 2 and 7, and the sleeve 31R is very clearly shown in an enlarged form on FIGS. 8 and 9. When the cover snaps open, the bumpers 11L and 11R slide on the rods 5R and 5L respectively and strike the sleeves 31L and 31R. Snubbing links 9L and 9R are pivotably attached to bumpers 10L and 10R. These bumpers are passed through respectively the torsion bar members 3L and 3R and are joined by members 7L and 7R to torsion bar members 4L and 4R. The opposite snubbers 11L and 11R slide on torsion bar elements 5R and 5L. It will be seen that these sleeves also act as stops for the bumpers as do the brackets 7L and 7R. A portion of the shock of opening is taken by these bumpers, which can be made from a resilient material, and also by bending of the torsion bar as induced by the snubbing mechanism, which will be shown more clearly in FIG. 8.

Figure 2:
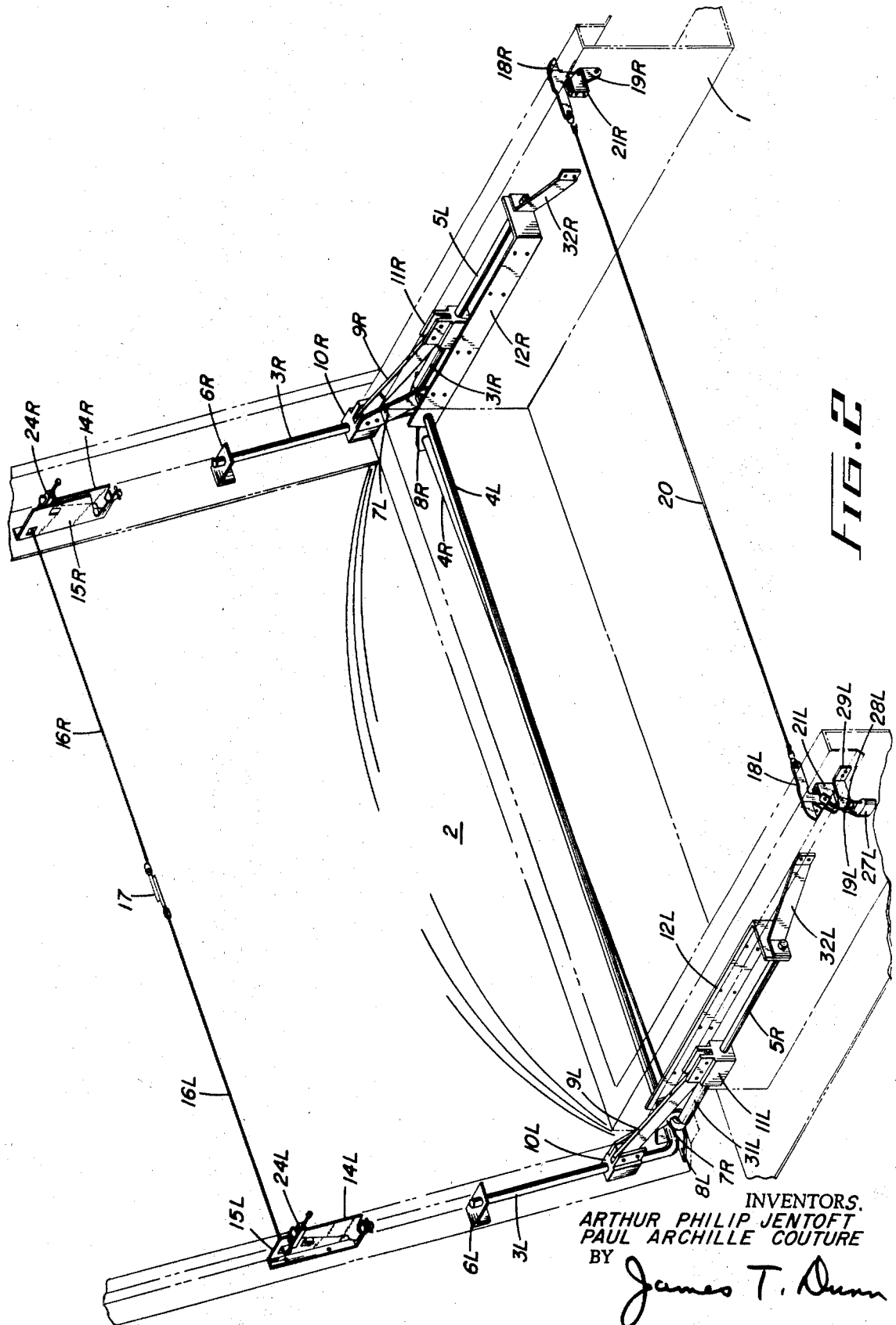
FIG. 2 is a similar view with the skylight manually opened and the fusible link intact.

FIG. 1 shows the situation where the fusible link 17 has melted and the cables 16L and 16R are loose, whereas FIG. 2 shows the same elements as FIG. 1 but in a position when the cover has been deliberately opened manually. FIG. 1 shows fixed engagement bars 13L and 13R which are engaged by levers 14L and 14R which are mounted in brackets 15L and 15R on the cover. While the mechanism is shown on FIG. 2, it is shown in more detail in FIG. 11, which shows only one side of the cover. The lever 14L extends into a rigid metallic loop 24L, the point of latching being adjusted by the knurled screw 25L and, of course, a corresponding member on the right hand side, which however is not shown in FIG. 11. The loop 24L is fastened to the cable 16L, and in a similar manner a loop on the other side of the cover. These loops are connected together through the cables 16L and 16R and a fusible link 17 in the center of the cables. This link will be seen intact in FIG. 2. FIG 2 also shows manual latches 18L and 18R which can be actuated from the roof by pulling the lever ends 19L and 19R or by a connecting cable 20. In FIG. 2 the latches, which are pivoted in brackets 21L and 21R have been actuated but the cables and the fusible link 17 are still intact as the opening was not the result of a fire which would cause the fusible link to melt. FIG. 2 also shows a padlock 27L which can be used where it is desired to prevent manual actuation of the hold-down latches 18L and 18R from the roof.

Figure 11:
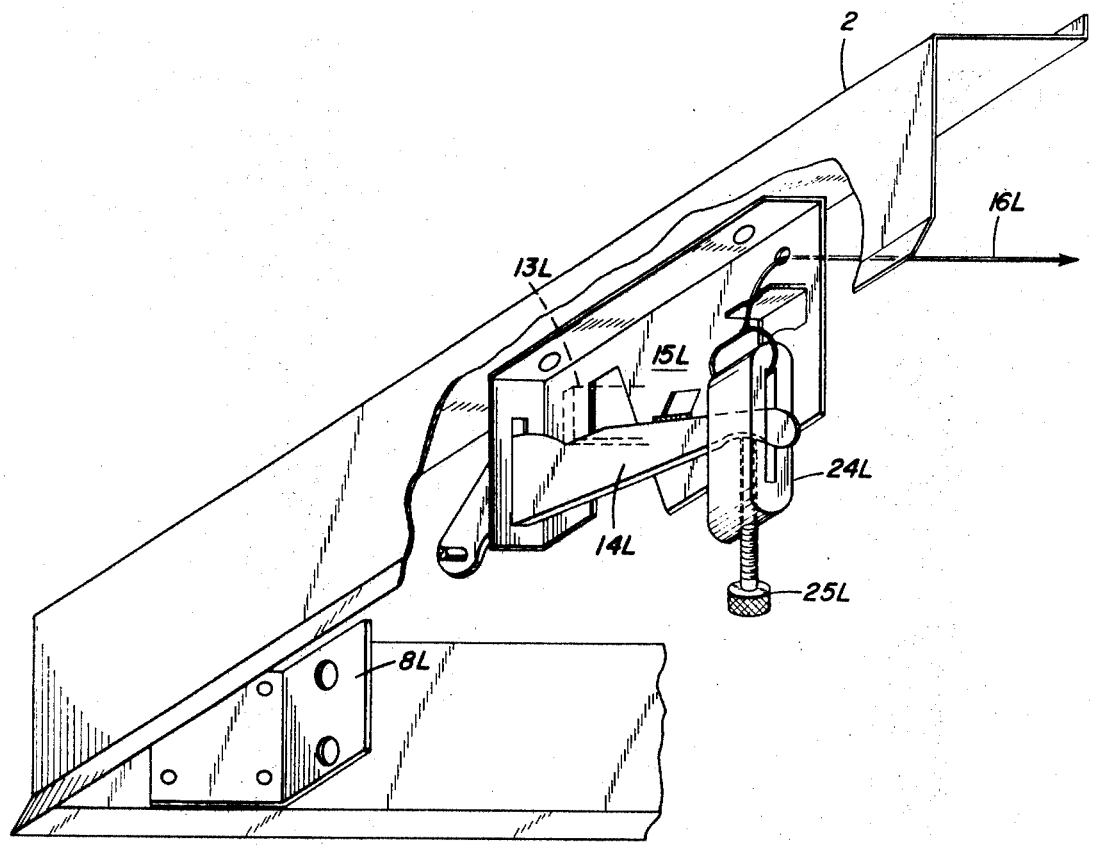
FIG. 11 is a detail of the latch operated by melting a fusible link corresponding to the latching mechanism of FIG. 1.

FIG. 17, which is substantially similar to FIG. 11, shows the detail of the latching mechanism in the cover for the modification where it can be operated also manually from the outside or inside. In FIG. 11 the fixed bar latch 13L is shown, which corresponds to the modification in FIG. 1. In FIG. 17, however, this bar is replaced by the movable latch 18L shown with the mechanism generally appearing in FIG. 2. However, in order to illustrate another variant, the padlock 27L appearing in FIG. 2 is replaced with a short piece of cable 33L. This cable may be provided with a loop or handle and makes it easy to open the cover from the roof. It will be seen that this latching modification provides for releasing the cover latch in any one of three different ways. The first way is by fusion of the link 17 in the case of fire; the second way is from the inside by pulling on the cable 20, which is shown in FIG. 2 and which also appears in FIG. 12, which shows the corresponding single torsion bar modification; and, finally, the third way is to pull on the cable 33 from the roof. This permits a great deal of flexibility and constitutes a preferred modification. It will be noted that manual actuation, either from inside the cover or outside from the roof, does not disturb the fusible link release system lever 14. Hence, the cover can be opened repeatedly without affecting the fusible link operation in case of fire. If the fusible link is in a cable going to a latch, as has been described in the background of the invention, manual actuation, if too vigorous, can result in breaking the fusible link. Also it is desirable to periodically inspect the fusible link actuation system from the roof when the cover is in an open position. In the preferred modification of the present invention, which is described above, there is no danger of disturbing the fusible link release system when the cover is opened since the operating mechanisms are entirely separate.

Figure 3:
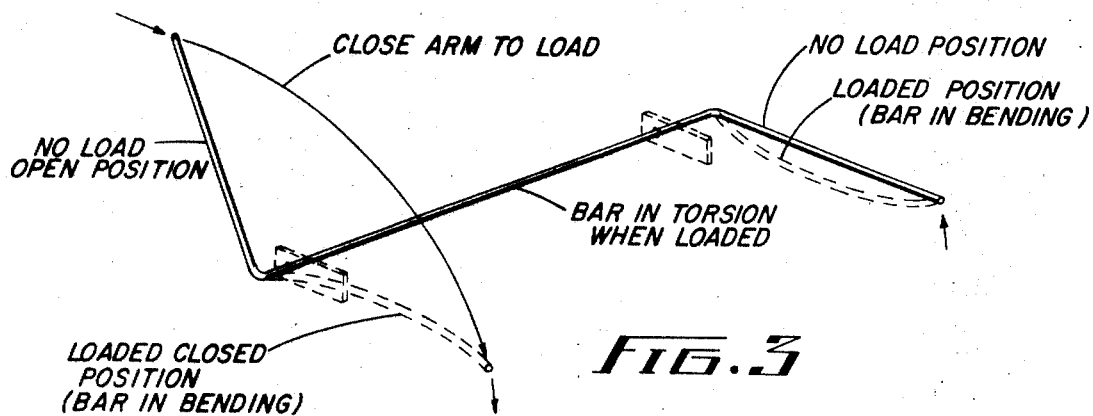
FIG. 3 is a diagram of the torsion bar showing it in two positions.
Figure 4:
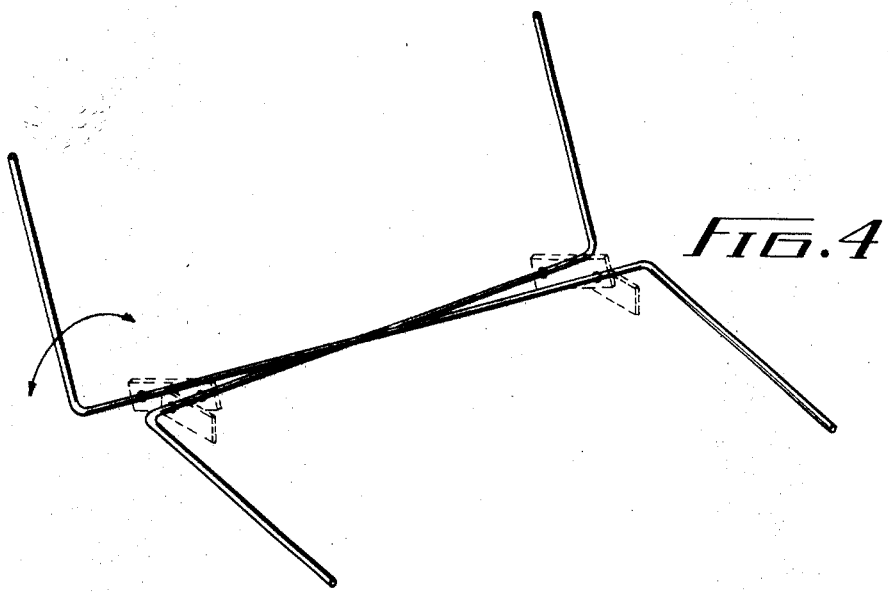
FIG. 4 is a similar diagrammatic showing of two torsion bars, one on each side of the vent.
Figure 5:
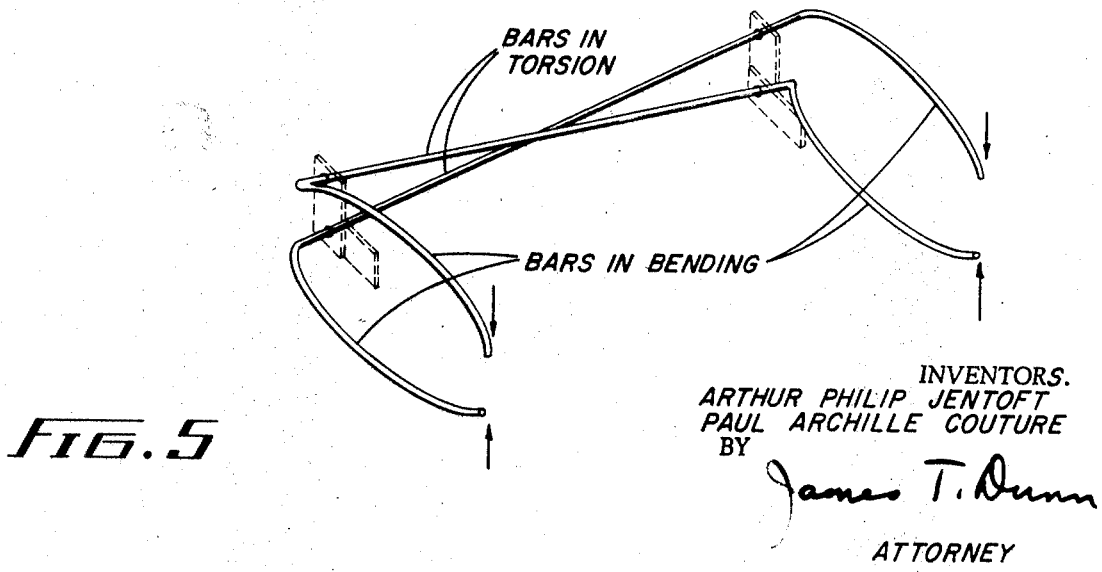
FIG. 5 is a diagram similar to FIG. 4 but showing the torsion bars in the closed position.

FIGS. 3 to 5 are purely diagrammatic, showing only the torsion bars and their immediate supports. FIG. 3 shows one torsion bar in full lines in the position when the cover is open, and it shows in dashed lines the position when it is closed. It will be noted that in the dashed line positions both end portions of the torsion bar are bent and thereby add to the force provided by torsion. When the skylight is suddenly opened, as for example in case of fire, the bending of the member 3L would momentarily be in the opposite direction (not shown), and would take up the part of the shock when the cover suddenly reaches its open position. In the diagrammatic figures the amount of bending is somewhat exaggerated for clarity.

FIG. 4 shows a pair of torsion bars in the open position and FIG. 4 a pair in the closed position, again with the bending of the members exaggerated.

Figure 10:
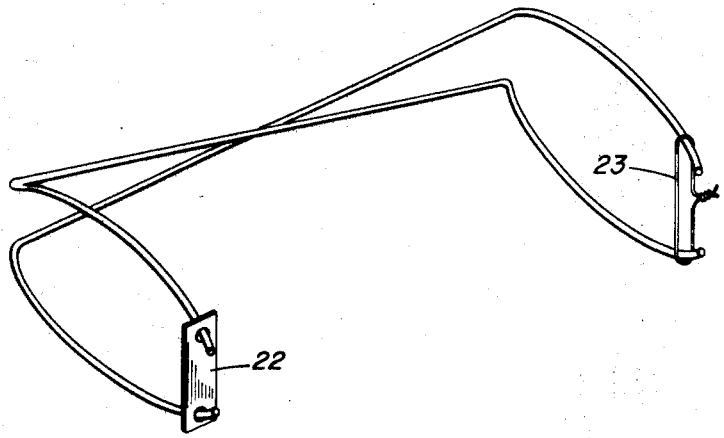
FIG. 10 is a diagram of two torsion bars in the closed position with protection against opening during shipping.

FIG. 10 shows the torsion bars in the closed position for shipping. They are held in this position either by a safety plate 22 with two holes through which the ends of the bars protrude or a safety cable 23. Obviously, of course, in any particular case the same kind of protection would be provided for both ends but FIG. 10 is a diagram to illustrate various possibilities.

FIG. 6 is a detail on a somewhat enlarged scale of one end of a torsion bar showing its brackets in the curb of the skylight and also the sleeve 31R. This figure also shows the bracket 8R somewhat more clearly than in FIGS. 1, 2 and 7 as the other torsion bar from the right hand side of the skylight is not shown in this figure, which merely shows the opening through which the center portion 4R passes. FIG. 8, which does show this bar in an enlarged form, complements FIG. 6.

Figure 9:
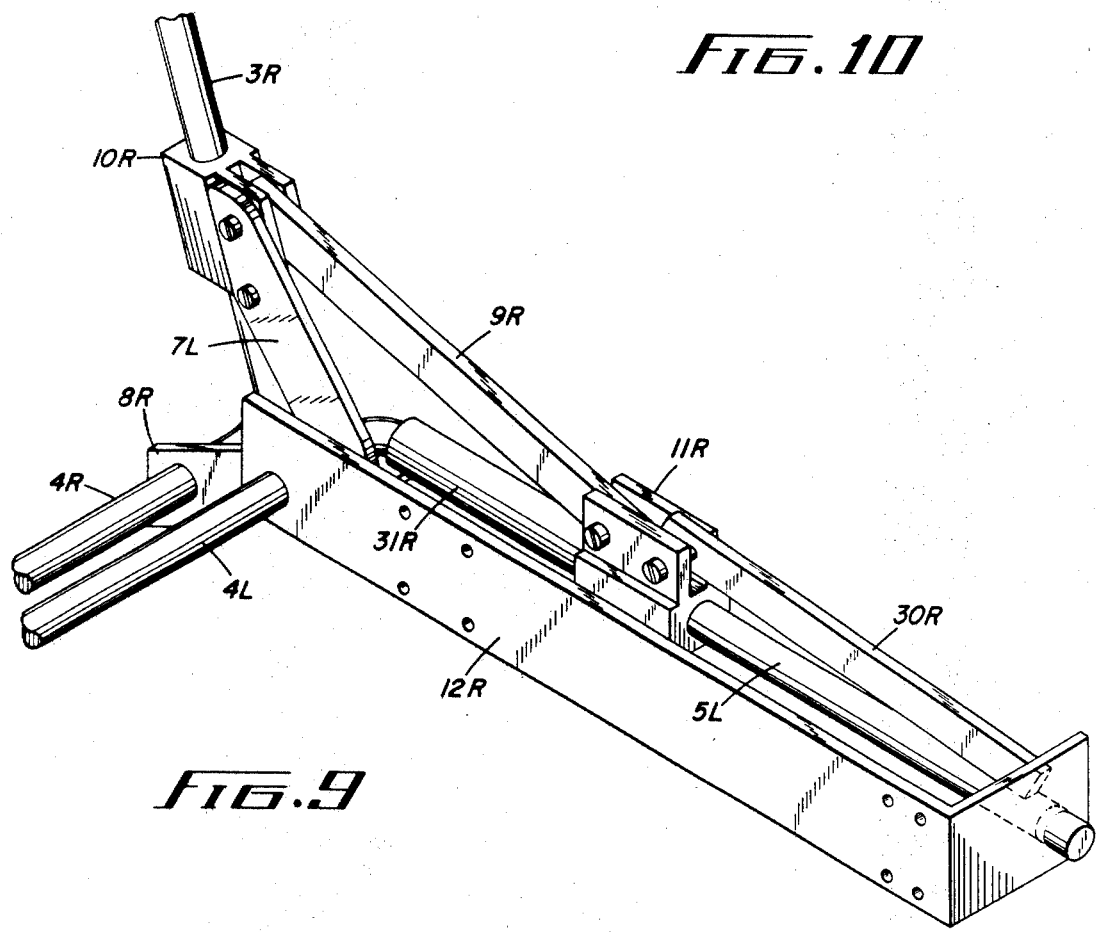
FIG. 9 is an enlarged semi-diagrammatic detail of a locking mechanism for locking the cover in the open position.

FIG. 9, which shows diagrammatically a right hand torsion bar, shows the locking by means of a locking bar 30R which drops into place and prevents the bar 9R connecting the two bumpers from moving once the cover has opened. As has been pointed out before, this prevents any possibility of the cover accidentally being blown shut in a heavy wind. The locking bar drops into locking position automatically as the cover snaps open but can easily be disengaged manually when the cover is closed.

It will be noted that FIG. 8, which shows the mechanism at the instant when the cover has suddenly opened and the shock is being taken up, does not show the locking bar in order to avoid confusion of the drawing. However, it does show in dashed lines that the torsion bar bends at the moment of shock due to the snubbing force developed in bars 9L and 9R. The amount of bending is exaggerated for clarity. It will be noted, of course, that this is a bending of the torsion bar element 5L because of course this is a portion of the torsion bar leading to the left hand attachment on the cover. Naturally, of course, when the shock of the opening has been taken up, the torsion bar member 5L returns to its normal straight position, which is shown in FIG. 8 in solid lines. This figure is a semi-diagrammatic figure, and not only is the locking bar omitted but some of the other structural features of the vent itself and its curb have been omitted in order to make the operation of the mechanism more clear.

FIG. 7 shows an optional electrical operation of the left and right hand manual latches 18L and 18R, which appear in FIG. 2. Electrical operation is by means of the solenoids 26L and 26R. These solenoids can be actuated remotely either by a remote fire sensor or by a pushbutton or by both. In an actual installation where electrical operation is used, of course the manual cable 20 may not be eliminated. In other words, the latches 18L and 18R can also be manually actuated from the inside.

It will be noted from a consideration of FIGS. 2 and 7 that the latches 19L and 19R are on the outside of the curb and so can be actuated from the roof. However, to prevent unauthorized opening of the covers from persons on the roof, they can be locked by a padlock 27L, shown in FIG. 2, which fastens through a hole 28L in the lever 19L and a fastening 29L on the curb. The opposite side has the latch members 18R and 19R pivoting on a bracket 21R. Brackets 21L and 21R are on the outside of the curb. Separate locking means is, therefore, necessary for the right hand lever as this lever is connected to the left hand lever through the cable 20. Obviously, of course, the lever latches 18R and 19R can be mounted on a bracket 21R on the inside of the curb to eliminate the need for a second padlock.

With covers of small to moderate size it is often not necessary to provide two torsion bars as a single one can exert adequate force.

Figure 14:
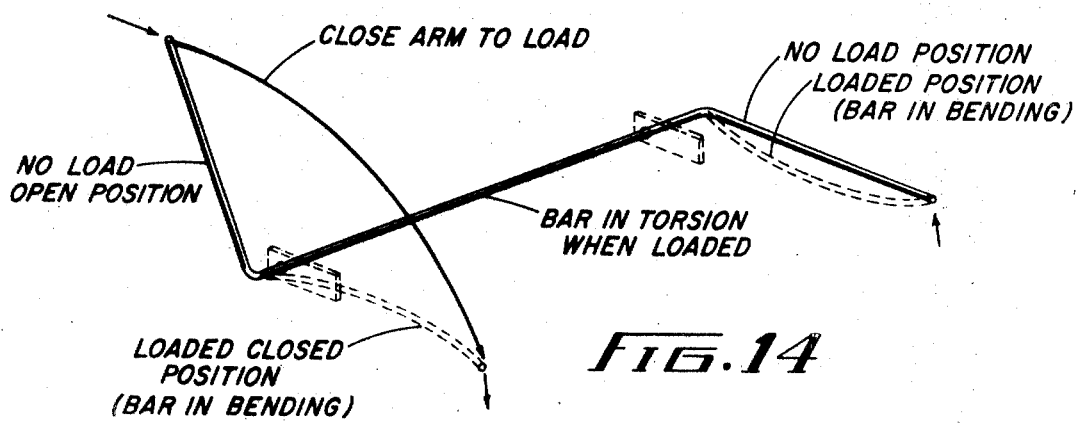
FIGS. 14 to 16 are diagrams similar to FIGS. 3 to 5 but showing a single torsion bar instead of a pair.
Figure 15:
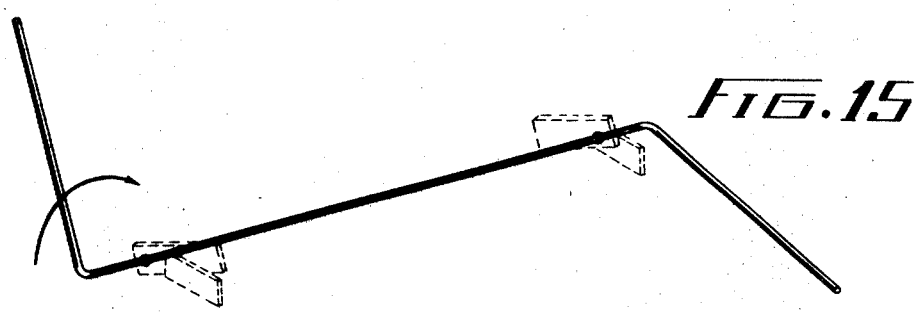
Figure 16:
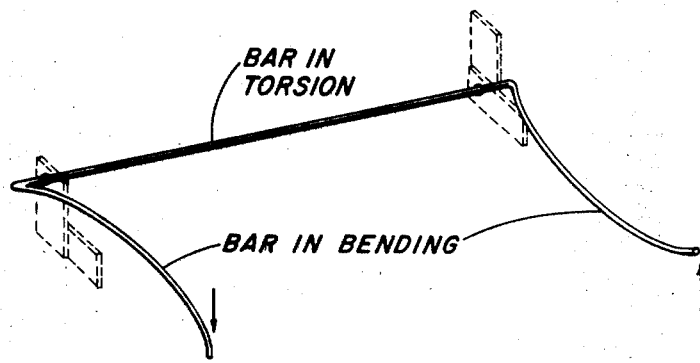

FIGS. 14 to 16 show diagrammatically a single torsion bar in the positions corresponding to the pair of torsion bars in FIGS. 3 to 5, and what was said there with respect to showing the bending of the bars applies equally to FIGS. 14 to 16, which have merely omitted the second torsion bar.

Figure 12:
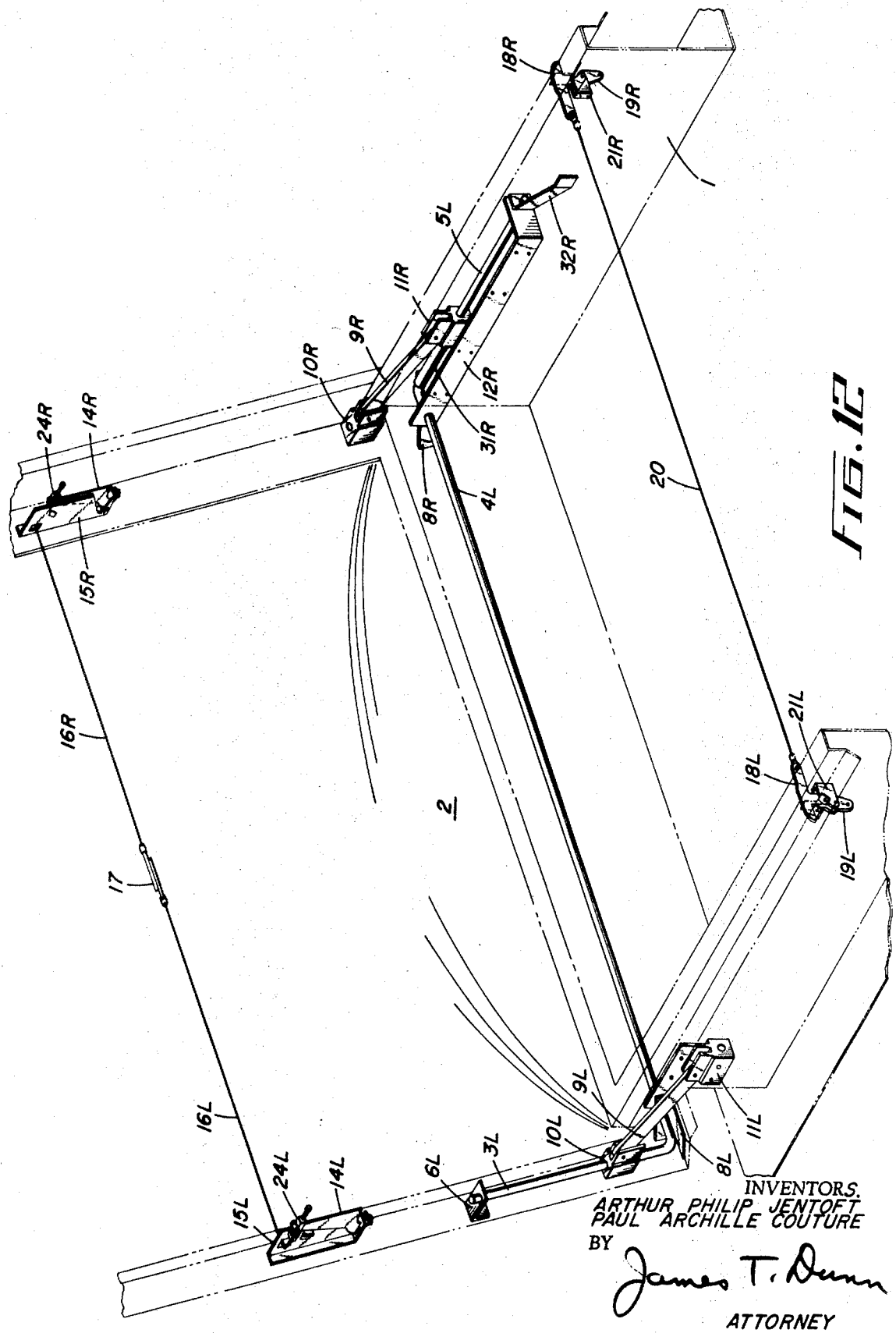
FIG. 12 is similar to FIG. 2 but shows a single torsion bar instead of a pair.
Figure 13:
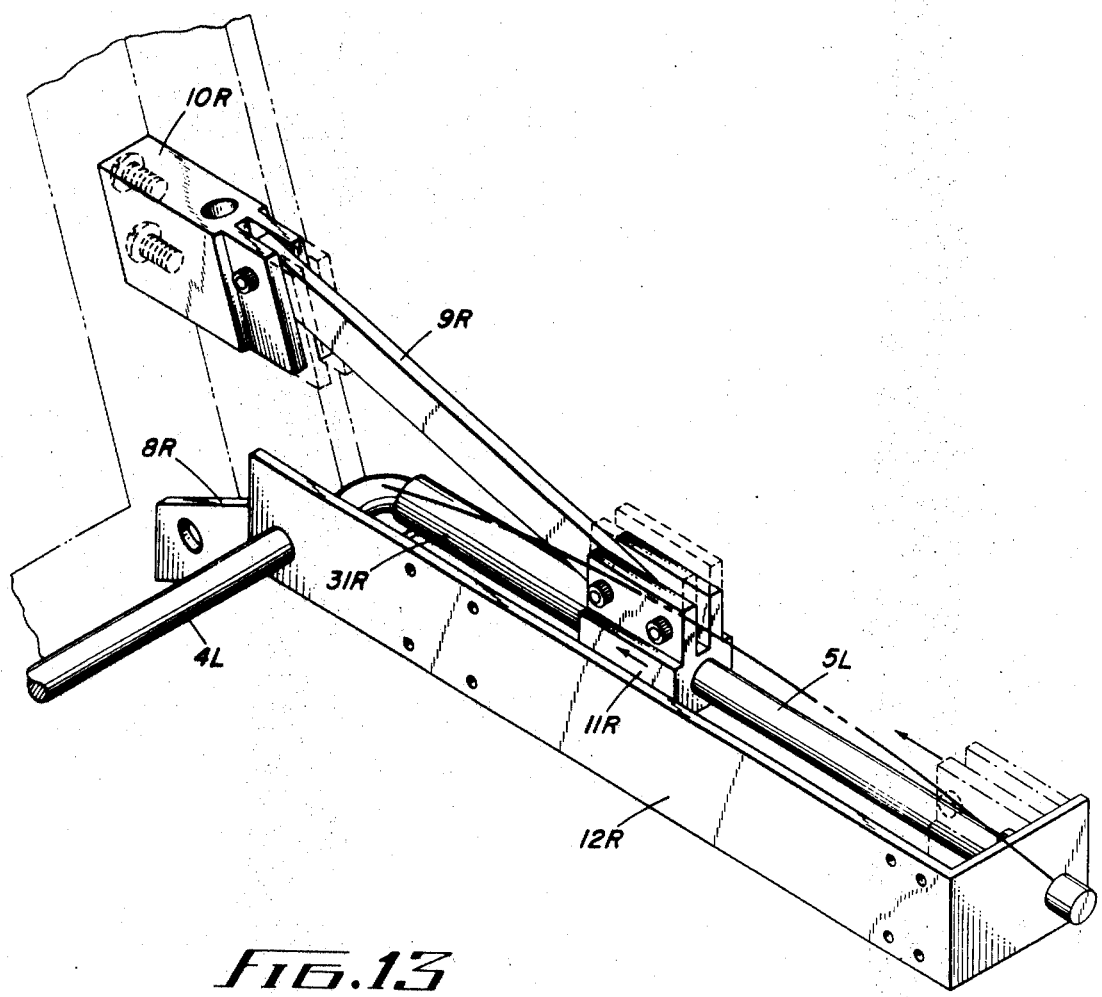
FIG. 13 is a detail of the rod attachment on the right side of the cover, which performs the function of the cover leg of the right hand torsion bar in FIG. 2.

FIG. 12 corresponds to FIG. 2 but shows only a single torsion bar, namely that one represented by 3L, 4L and 5L. The snubbing mechanism on the right hand side requires that the bracket 10R be connected to the cover. In FIG. 2 this fitting was attached to torsion bar leg 3R. Since torsion bar 3R, 4R, and 5R has been eliminated, it is necessary to provide this substitute connection. This is shown in detail in FIG. 13. In FIG. 2 the torsion bar leg 4R became the hinge pin for the cover hinge bracket 8R and the body hinge bracket 12R. In the case where torsion bar leg 4R is eliminated, it will be necessary to provide a substitute hinge pin of equivalent diameter.

The operation of the cover with a single torsion bar, as shown in FIGS. 12 to 16, is of course identical with the operation of FIGS. 1 to 10 except that there is only one torsion bar. Hence, as the details of FIGS. 6 to 8 and FIG. 9 are not changed, except for the elimination of the second torsion bar in FIGS. 7, 8 and 9, these figures are not repeated with a single torsion bar.

In the drawings the cover has been shown somewhat diagrammatically as having a flat surface, which might be the case. However, a translucent or transparent skylight of plastic, such as acrylic plastic, of flat or domed shape or a formed metal cover with a center peak is more often used than flat covers and is the customary form on most buildings. However, as the present invention is not concerned with the material or particular shape of the cover itself but only in its actuating mechanism, the showing of a domed transparent plastic skylight or peaked metal cover is omitted to make the drawings more clear.

In actual vents there is a problem of water leakage in heavy rains, and ordinarily the cover frame has interposed between it and the curb of the well a suitable gasket to make a watertight connection. This part of the vent structure is in no way changed by the improved opening mechanism which forms the subject matter of the present invention, and therefore it is not shown in the drawing as it would only serve to complicate and confuse the drawings. It is not changed by the present invention and so does not actually form a part of the invention itself. A clear, detailed showing of a translucent dome skylight is illustrated in FIG. 2 of the Wasserman Pat. 3,017,721. This patent is an illustration of a typical structure which is operated by springs, but it clearly shows the shape of the dome of the skylight and the provision of gaskets and extending gutter lips.

We claim:
1. In a roof covering construction comprising side walls forming an enclosed well including a curb wall with a hinged cover and means for opening the cover in case of fire, the improvement which comprises in combination,
   (a) at least one torsion bar member which in the opened position of the cover has a Z form in three dimensions, each torsion bar being composed of three members, a first member attached to the side of the cover on its inner surface, a center member held by means near both ends by the curb wall and acting as a hinge pin, and a third member of length comparable to the first member extending along and fastened to the curb wall on the opposite side,
   (b) the center portions of each torsion bar acting both as a hinge pin for the cover and as a torsion bar to supply the power for opening the cover, which when it is closed causes the torsion bar to assume the general shape of a C,
   (c) the attaching means of the first and third members of each torsion bar to the cover and side wall respectively being positioned to hold the bar sufficiently out of contact with the cover and side wall respectively so that these portions of the bar are capable of bending in the closed position developing a portion of the power for opening the cover and at the moment when the cover snaps open absorbing a portion of the shock, said third member is of sufficient length to allow said bending,
   (d) latching means connected to the cover and side walls for holding the cover in the closed position, and
   (e) means for unlatching the latching means whereby on occurrence of a fire the cover springs to its open position under the urging of the torsion power in the center section of each torsion bar and the bending power in the outer element of each torsion bar.

2. A roof covering construction according to claim 1 in which the torsion bar orientation and construction causes the cover to open on unlatching of the latching means to an angle greater than 90°, whereby down drafts through an open cover in high winds are minimized.

3. A roof covering construction according to claim 1 in which the fire actuated unlatching means includes a fusible link and cable connections therefrom to the latching means.

4. A roof covering construction according to claim 1 in which the cover and side walls are attached through linkages in addition to the torsion bars and the linkages include resilient shock absorbing elements which come into play when the cover is opened suddenly to its maximum point and which aid the bending of the torsion bar end elements to minimize shock.

5. A roof covering construction according to claim 1 in which detachable locking means are provided locking the cover in its open position against closing under wind pressure.

6. A roof covering construction according to claim 1 in which manual unlatching means are provided both inside and outside of the building for manually causing the cover to open without imposing strain on the fusible link.

7. A roof covering construction according to claim 6 in which further electrically operated unlatching means are provided which can be actuated from a remote point in the building.

8. A roof covering construction according to claim 1 in which there is a pair of torsion bar members, a member of one torsion bar attached to the cover being attached at one side and the corresponding member of the second torsion bar being attached to the other side of the cover, the third members correspondingly being fastened to the curb walls on opposite sides.

References Cited

UNITED STATES PATENTS

| | | | |
|---|---|---|---|
| 2,984,517 | 5/1961 | Farrow et al. | 49—386 X |
| 3,017,721 | 1/1962 | Wasserman | 52—1 |
| 3,067,453 | 12/1962 | Lyons | 49—386 X |
| 3,078,001 | 2/1963 | Young et al. | 292—338 X |
| 3,153,255 | 10/1964 | Bostwick | 49—386 X |
| 3,182,581 | 5/1965 | Von Poederoyen et al. | 49—8 X |
| 3,350,819 | 11/1967 | Polidoro et al. | 52—1 |
| 3,399,500 | 9/1968 | Shapiro | 52—1 |

FRANK L. ABBOTT, Primary Examiner

S. D. BURKE III, Assistant Examiner

U.S. Cl. X.R.

49—8, 386; 52—200